(12) United States Patent
Kuenzel et al.

(10) Patent No.: US 6,517,657 B1
(45) Date of Patent: Feb. 11, 2003

(54) FLUOROPOLYMER COMPOSITE TUBE AND METHOD OF PREPARATION

(75) Inventors: Kenneth J. Kuenzel, Grass Lake, MI (US); Edward K. Krause, Ann Arbor, MI (US)

(73) Assignee: Pilot Industries, Inc., Dexter, MI (US)

( * ) Notice: Subject to any disclaimer, the term of this patent is extended or adjusted under 35 U.S.C. 154(b) by 111 days.

(21) Appl. No.: 09/638,472

(22) Filed: Aug. 14, 2000

Related U.S. Application Data

(63) Continuation-in-part of application No. 09/238,975, filed on Jan. 27, 1999, now abandoned, which is a division of application No. 08/707,663, filed on Sep. 4, 1996, now Pat. No. 5,916,404, which is a continuation-in-part of application No. 08/265,679, filed on Jun. 24, 1994, now Pat. No. 5,759,329, which is a continuation-in-part of application No. 08/083,042, filed on Jun. 24, 1993, now abandoned, which is a continuation-in-part of application No. 07/817,304, filed on Jan. 6, 1992, now abandoned, and a continuation-in-part of application No. 08/403,499, filed on Mar. 14, 1995, now Pat. No. 5,554,425, which is a division of application No. 08/200,941, filed on Feb. 23, 1994, now abandoned, which is a continuation of application No. 07/817,304, filed on Jan. 6, 1992, now abandoned.

(51) Int. Cl.⁷ .......................... B29C 47/06; B32B 31/12
(52) U.S. Cl. .......................... 156/244.17; 156/244.23; 156/272.2; 156/272.6; 156/272.8
(58) Field of Search .................. 156/244.11, 244.17, 156/244.23, 272.2, 272.6, 272.8, 274.4, 274.6

(56) References Cited

U.S. PATENT DOCUMENTS

| | | |
|---|---|---|
| 3,017,339 A | 1/1962 | Dewey |
| 3,133,854 A | 5/1964 | Simms |
| 3,317,339 A | 5/1967 | Fortner et al. |
| 3,352,714 A | 11/1967 | Anderson et al. |
| 3,361,607 A | 1/1968 | Bruno |
| 3,364,056 A | 1/1968 | Siebel |
| 3,375,126 A | 3/1968 | Nagel |
| 3,455,774 A | 7/1969 | Lindsey et al. |
| 3,457,139 A | 7/1969 | James |
| 3,473,087 A | 10/1969 | Slade |

(List continued on next page.)

FOREIGN PATENT DOCUMENTS

| | | |
|---|---|---|
| CA | 686119 | 5/1964 |
| DE | 1290717 | 3/1969 |
| DE | 3524631 A1 | 1/1986 |

(List continued on next page.)

OTHER PUBLICATIONS

"Pilot Industries Wins Top Plunkett Award," Plastics News, Wilmington, Delaware, Apr. 5, 1993, p. 8.

(List continued on next page.)

Primary Examiner—Sam Chuan Yao
(74) Attorney, Agent, or Firm—Gifford, Krass, Groh, Sprinkle, Anderson & Citkowski, P.C.

(57) ABSTRACT

Described herein is a method of preparing a fluoropolymer composite comprising the steps of activating the fluoropolymer substrate and thereafter applying a layer of a different polymer to the activated fluoropolymer substrate. The activation step can be described as a mixed gas plasma discharge or an electrically formed plasma. Also described herein are other methods of surface activation including exposure to excimer laser, gamma rays, x-ray flux, electron beam, sodium naphthalate bath, coupling or curing agents, and others. In particular, described is a fuel pipe comprised of an inner fluorocarbon layer having electrostatic discharge resistance and hydrocarbon evaporative emission resistance chemically bonded to an outer layer of a cross-linked polyethylene polymer. There is no need for additional adhesives. Fluoropolymer layers have excellent chemical resistance.

5 Claims, 1 Drawing Sheet

U.S. PATENT DOCUMENTS

| | | | |
|---|---|---|---|
| 3,507,763 A | 4/1970 | McBride | |
| 3,539,443 A | 11/1970 | Jackson | |
| 3,676,181 A | 7/1972 | Kowalewski | |
| 3,907,955 A | 9/1975 | Viennot | |
| 4,011,121 A | 3/1977 | Doss | |
| 4,035,534 A | 7/1977 | Nyberg | |
| 4,188,426 A | 2/1980 | Auerbach | |
| 4,259,408 A | 3/1981 | Moschter | |
| 4,272,585 A | 6/1981 | Strassel | |
| 4,293,663 A | 10/1981 | Stivers | |
| 4,311,745 A | 1/1982 | Civardi | |
| 4,330,017 A | 5/1982 | Satoh et al. | |
| 4,343,861 A | 8/1982 | Stivers | |
| 4,353,763 A | 10/1982 | Simons | |
| 4,358,559 A | 11/1982 | Holcomb et al. | |
| 4,383,131 A | 5/1983 | Clabburn | |
| 4,432,820 A | 2/1984 | Thompson | |
| 4,515,831 A | 5/1985 | Wille | |
| 4,564,662 A | 1/1986 | Albin | |
| 4,603,712 A | 8/1986 | Krause | |
| 4,622,237 A | 11/1986 | Lori | |
| 4,634,615 A | 1/1987 | Versteegh et al. | |
| 4,636,272 A | 1/1987 | Riggs | |
| 4,654,235 A | 3/1987 | Effenberger et al. | |
| 4,702,956 A | 10/1987 | Wilson et al. | |
| 4,718,568 A | 1/1988 | Palu | |
| 4,731,156 A | 3/1988 | Montmarquet | |
| 4,743,327 A | 5/1988 | DeHaan et al. | |
| 4,748,204 A | 5/1988 | Kawashima et al. | |
| 4,749,610 A | 6/1988 | Katsuragawa et al. | |
| 4,758,455 A | 7/1988 | Campbell et al. | |
| 4,770,927 A | 9/1988 | Effenberger et al. | |
| 4,780,158 A | 10/1988 | Thomas | |
| 4,800,109 A | 1/1989 | Washizu | |
| 4,802,943 A | 2/1989 | Gibbons et al. | 156/244.23 |
| 4,826,731 A | 5/1989 | Wagner et al. | 428/422 |
| 4,871,406 A | 10/1989 | Griffith | 156/82 |
| 4,887,647 A | 12/1989 | Igarashi et al. | 138/126 |
| 4,898,638 A * | 2/1990 | Lugez | 156/242 |
| 4,933,060 A | 6/1990 | Prohaska | 204/192.36 |
| 4,943,473 A * | 7/1990 | Sahatjian et al. | 428/334 |
| 4,995,028 A | 2/1991 | Boling et al. | 369/275.5 |
| 5,008,340 A | 4/1991 | Guerra et al. | 525/193 |
| 5,051,978 A | 9/1991 | Mayer et al. | 369/275.5 |
| 5,056,512 A | 10/1991 | Bower et al. | 128/201.25 |
| 5,059,480 A | 10/1991 | Guerra et al. | |
| 5,077,115 A | 12/1991 | Arthur et al. | |
| 5,081,326 A | 1/1992 | Usui | |
| 5,089,200 A | 2/1992 | Chapman, Jr. et al. | |
| 5,092,947 A | 3/1992 | Halg et al. | |
| 5,108,780 A | 4/1992 | Pitt et al. | |
| 5,114,510 A | 5/1992 | Wright | |
| 5,124,878 A | 6/1992 | Martucci | |
| 5,141,800 A | 8/1992 | Effenberger et al. | |
| 5,170,011 A | 12/1992 | Martucci | |
| 5,284,184 A | 2/1994 | Noone | |
| 5,290,424 A * | 3/1994 | Mozelewski et al. | 156/272.6 |
| 5,296,510 A | 3/1994 | Yamada et al. | |
| 5,300,361 A | 4/1994 | Vowinkel et al. | |
| 5,357,005 A | 10/1994 | Buchwalter et al. | |
| 5,425,832 A * | 6/1995 | Kusano et al. | 156/272.6 |
| 5,437,900 A * | 8/1995 | Kuzowski | 128/DIG. 14 |
| 5,500,257 A | 3/1996 | Krause et al. | |
| 5,554,425 A | 9/1996 | Krause et al. | |
| 5,759,329 A * | 6/1998 | Krause et al. | 156/244.13 |
| 5,879,757 A * | 3/1999 | Gutowski et al. | 156/272.6 |

FOREIGN PATENT DOCUMENTS

| | | |
|---|---|---|
| DE | 3930350 | 3/1991 |
| EP | 0185590 | 6/1986 |
| EP | 479592 | 4/1992 |
| GB | 2204932 | 11/1988 |
| JP | 1174442 | 10/1976 |
| JP | 51119777 | 10/1976 |
| JP | 5358588 | 5/1978 |
| JP | 573373 | 6/1979 |
| JP | 58114979 | 8/1983 |
| JP | 58201613 | 11/1983 |
| JP | 62162542 | 7/1987 |
| JP | 639533 | 2/1988 |
| JP | 63224943 | 9/1988 |
| JP | 1154755 | 6/1989 |
| JP | 2107371 | 4/1990 |
| JP | 3114829 | 5/1991 |

OTHER PUBLICATIONS

"'P–CAP' from Pilot Industries Inc. First Place Winner 1993 Plunkett Awards for Innovation with Teflon, " DuPont Background, DuPont External Affairs, Wilmington, Delaware.

"Pilot Industries Wins Top Award for Innovation," Pilot Industries Inc., Dexter, Michigan.

Ceramic Coatings: More Than Just Wear Resistant, Edward S. Hamel, ME, Aug. 1986, pp. 30–34.

"DuPont Announces Winners for 1993 Plunkett Awards for Innovation with 'Teflon'," DuPont News, DuPont external Affairs, Wilmington, Delaware, Mar. 1993.

Cefral Soft, Technical Data,Central Glass Co., Ltd.

Dyne–A–Mite(TM) Solves Adhesion Problems, Promotional brochure from Enercon Industries Corporation, Menomee Falls, Wisconsin (no date).

Plasma Treatment Upgrades Adhesion in Plastic Parts, Stephen L. Kaplan and Peter W. Rose, Plastics Engineering, May 1988, pp. 77–79.

Achieving Optimum Bond Strength With Plasma Treatment, George P. Hansen et al., Society of Manufacturing Engineers, Sep. 1989, Paper No. AD 89–537.

Plasma–Sprayed Coatings, Herbert Herman, Scientific American, Sep. 1988, pp. 112–117.

Properties of Polymers Used in Hose Manufacture, Chapter 16, Hose Technology, Colin W. Evans.

* cited by examiner

FLUOROPOLYMER COMPOSITE TUBE AND METHOD OF PREPARATION

CROSS REFERENCE TO RELATED APPLICATIONS

This is a continuation in part of Ser. No. 09/238,975 filed Jan. 27, 1999 now abandoned, which is a divisional of Ser. No. 08/707,663 filed Sep. 4, 1996 now U.S. Pat. No. 5,916,404, which is a continuation in part of Ser. No. 08/265,679 filed Jun. 24, 1994 now U.S. Pat. No. 5,759,329, which is a continuation in part of Ser. No. 08/083,042, filed Jun. 24, 1993 now abandoned, which is a continuation in part of Ser. No. 07/817,304, filed Jan. 6, 1992 now abandoned and Ser. No. 08/403,499, filed Mar. 14, 1995 now U.S. Pat. No. 5,554,425, which is a divisional of Ser. No. 08/200,941, filed Feb. 23, 1994 now abandoned, which is a continuation of Ser. No. 07/817,304, filed Jan. 6, 1992 now abandoned.

BACKGROUND OF THE INVENTION

I. Field of the Invention

The invention pertains to the field of fluoropolymer hoses and tubes such as fluoropolymer composite pipes used in fuel lines.

II. Description of the Prior Art

With the advent of increased concern over evaporative fuel emission standards, there has been an increasing need for fuel lines that meet more stringent evaporative emission requirements, while at the same time having high chemical and electrostatic discharge resistance. Further, in order to be economical, any fuel line must be able to be produced in large quantities at a low cost. A desirable fuel line should have appropriate physical properties including, but not limited to, sufficient tensile strength and kink resistance, or the ability of the fuel line to retain a particular shape upon bending.

Fuel line hoses of a variety of materials have been suggested over the years. Tetrafluoroethylene has been utilized and has excellent and outstanding high temperature and chemical resistance. "Hose Technology," publisher: Applied Science Publisher, Ltd., Essex England, by: Colin W. Evans, pages 195–211. Nylon has also been utilized as a hose composition. However, fluorinated polymers are difficult to use because of the difficulty in adhering other materials to them in order to form desirable composites.

U.S. Pat. No. 4,933,060 discloses surface modification of fluoropolymers by reactive gas plasma. The reference, however, further indicates that in order to have sufficient bonding, adhesives must be utilized prior to the application of an additional layer. Suitable adhesives are epoxies, acrylates, urethanes, and the like.

U.S. Pat. No. 4,898,638 teaches a method of manufacturing flexible gaskets which withstand chemical agents. Flexible gaskets are prepared in which one film of PTFE (polytetrafluoroethylene) is directly applied onto a sheet of raw rubber and the sheet of rubber together with the film of PTFE is subjected to heating and pressure suitable for causing the rubber to vulcanize. Use of adhesives in the bonding of fluoropolymers is likewise described in U.S. Pat. No. 4,743,327, and their use is required to make the development operative. Activating fluoropolymers utilizing ammonia gas is taught in U.S. Pat. No. 4,731,156.

None of the prior art describes a fluoropolymer with an outer layer of a different polymer that is integral with and chemically bonded to the fluoropolymer, which when combined in a multi-layered composite hose or pipe, has desirable electrostatic discharge resistance, hydrocarbon evaporative emission resistance, and flexibility. Further, the prior art suggests the need for adhesives to firmly and fixedly join plastic layers. This invention does not require additional adhesives to join the fluoropolymer layer to the other polymer layer because the layers are chemically bonded to each other.

Polymer surfaces typically lack the irregular structure necessary to achieve an effective mechanical bond. Therefore, methods such as etching or scuffing have been used to physically "roughen" the substrate surface. This invention however, by incorporating a chemical bond, does not require this mechanical alteration of the surface. It can be shown through various microscopic techniques (i.e. SEM) that no significant changes occur to the physical structure of the fluoropolymer substrate surface by the various means of surface activation employed in this invention such as exposure to a charged gaseous atmosphere, sodium naphthalate bath, a laser, silane and non-silane coupling agents, and the like. Furthermore, bonding has been achieved by these methods with materials such as thermoset elastomers which typically do not have processing viscosities sufficiently low to achieve adequate bond strength strictly by mechanical means.

It is an object of the present invention to have a fuel pipe or tube that has a fluoropolymer substrate that can be activated sufficiently to be able to have an integral and chemically bonded top coat or layer of a different polymer.

It is also an object of the present invention to prepare a fluoropolymer composite by extruding a multi-layered fluoropolymer substrate, one layer of which has desirable chemical, permeation, and electrostatic discharge resistance, and on top of the fluoropolymer layers would be extruded the different polymer layer.

SUMMARY OF THE PRESENT INVENTION

The present invention is concerned with a method of preparing a fluoropolymer composite tube comprising the steps of:

(1) forming a fluoropolymer substrate;

(2) activating a surface of the fluoropolymer substrate, (3) and thereafter applying a layer of a different polymer to the activated fluoropolymer such that there exist chemical bonds between the layers.

The fluoropolymer substrate can be activated in a number of ways such as subjecting the substrate to a charged gaseous atmosphere formed by electrically ionizing a gas which contacts the substrate, bathing the substrate in a sodium naphthalate bath, exposing the substrate to silane or non-silane coupling agents, exposing the substrate to a high-energy laser, or combinations thereof. Other means of activation which are known in the art may also be utilized, surface activation being broadly defined to mean those methods which have the effect of altering the electronic states of the surface of the fluoropolymer substrate without mechanically altering the surface. Mechanical alteration would include etching or scuffing the surface. Also, the different polymer can optionally contain a curing agent. Both the activation of the fluoropolymer layer and the addition of a curing agent to the different polymer layer serve to increase the strength of the chemical bonds between the layers.

The invention is also directed to a fuel pipe comprised of an inner fluorocarbon layer having electrostatic discharge resistance and hydrocarbon evaporative emission resistance, and on top of and integral with the fluorocarbon layer is an outer layer of a different polymer layer chemically bonded to the fluorocarbon layer.

BRIEF DESCRIPTION OF THE DRAWINGS

A better understanding of the present invention will be had upon reference to the following detailed description, when read in conjunction with the accompanying drawings, wherein like reference characters refer to like parts throughout the several views, and in which.

DETAILED DESCRIPTION OF PREFERRED EMBODIMENTS OF THE PRESENT INVENTION

Figure 1:
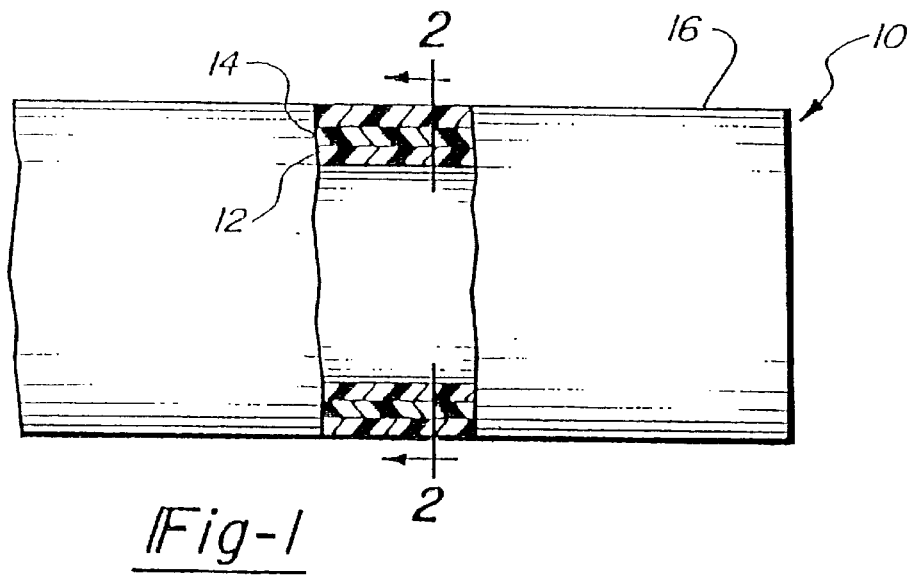
FIG. 1 is a side sectional view of the three-layered fuel pipe of the present invention.

The present invention is directed to a method of preparing a fluoropolymer composite such as a pipe or tube. In particular, it is preferred that the fluoropolymer be a multi-layered fluoropolymer. It is preferred that the inner fluoropolymer layer have electrostatic discharge resistance and the entire fluoropolymer layer have hydrocarbon evaporative emission resistance. The electrostatic discharge resistance is obtained preferably by making the fluoropolymer layer a conductive fluoropolymer. In this fashion, the electrostatic charge (electricity) that may be generated during the flow of fuel or other fluids through the pipe or tube can be carried to ground.

The composite tube of the present invention may have multiple layers without the presence of a conductive filler. Due to the need of having on board the vehicle a refueling vapor recovery system, it may be desirable to have a layer (or layers) of fluorocarbon polymer surrounded by a different polymer. In this manner, the fuel vapor alone can travel through the composite tube to any desirable location in the vehicle, e.g. an on-board carbonaceous containing canister. The carbon material can absorb the fuel vapors.

The fluoropolymers, that may be utilized are any of the available fluoropolymers, many of which are commercially available. Suitable fluoropolymers include, but are not limited to, ethylene-tetrafluoroethylene (ETFE), ethylene-chlorotrifluoroethylene (ECTFE), fluorinated ethylenepropylene (FEP), perfluoroalkoxy (PFA), polyvinylfluoride (PVF), polyvinylidene fluoride (PVDF), tetrafluoroethylene-hexafluoropropylene-vinylidenefluoride (THV), polychlorotrifluoroethylene (PCTFE), polytetrafluoroethylene (PTFE), hexafluoropropylene-tetrafluoroethylene-ethylene (THE). Other fluoropolymers are those that are prepared from perfluorinated α-fluoroolefin monomers containing hydrogen atoms as well as fluorine atoms. The α-fluoroolefin has 2–6 carbon atoms. Typical α-fluoroolefins may be perfluorinated as hexafluoropropene, perfluorobutene, perfluoroisobutene, and the like; as hydrogen-containing α-fluoroolefins such as trifluoroethylene, vinylidene fluoride, vinyl fluoride, pentafluoropropane, and the like; as halogen-containing α-fluoroolefins such as trifluorochloroethylene, 1,1-difluoro-2,2 dichloroethylene, 1,2-difluoro-1,2 dichloroethylene, trifluorobromoethylene and the like; and as perfluoroalkoxyethylene polymers. The most preferred fluoropolymer is ETFE sold under the trademark Tefzel® (trademark of DuPont).

The layer of fluoropolymer that is to be conductive in order to carry away the electrostatic discharge can generally be made conductive in a well known manner. This conductivity can occur by adding conductive particles to the fluoropolymer resin prior to processing. The electrically conductive particles incorporated into fluoropolymers are described in U.S. Pat. No. 3,473,087, hereby incorporated by reference. Suitable conducting materials would be carbon black in the amount of 0.1–10 weight percent of the total fluoropolymer layer, preferably 0.1–2 weight percent. The carbon black is blended with the fluoropolymer prior to the extrusion step. Conductive fluoropolymer resin is likewise commercially available.

It is preferred that the fluorinated polymer be extruded by a melt extrusion technique where the first layer would be a conductive fluoropolymer and co-extruded with it would be the second layer on top of the first layer, wherein the second layer is a fluoropolymer without the conducting particles therein.

On top of the fluoropolymer layer, integral with it, and chemically bonded to the fluoropolymer layer is an extruded different polymer material. The different polymer material can be a variety of materials, such as thermoset or thermoplastic polymers, and the like. Suitable materials would be those that can be extruded on top of the extruded fluoropolymer pipe or tube. Suitable thermosets include, but are not limited to, amide urethane elastomers, chlorinated polyethylene, chloroprene, chlorosulfonated polyethylene, copolyether ester, epichlorohydrin, ethylene acrylic, ethylene propylene, fluoroelastomer, perfluoroelastomer, fluorosilicone, hydrocarbon elastomers, hydrogenated nitrile butyl, isobutylene isoprene, isoprene, nitrile, polyacrylate, polybutadiene, polyester urethane, polyether urethane, polynorborene, polysulfide, polyurethanes, propylene oxide, silicone, styrene butadiene, styrenic elastomer, and thermoplastic elastomers. The most preferred thermoset polymer is VAMAC® ethylene/acrylic elastomer (trademark of DuPont), a copolymer of ethylene and methyl acrylate plus a cure site monomer.

Suitable thermoplastics include, but are not limited to, acrylate materials, polyester materials, bromoisobutene-isoprene materials, polybutadiene, chlorinated butyl rubber, chlorinated polyethylene, polychloromethyloxirane, chloroprene, chlorosulphonyl-polyethylene, ethyleneoxide and chloromethyloxirane polymer. Also included are ethylenepropylenedieneterpolymer, ethylene-propylenecopolymer, polyetherurethanes, isoprene, isobutene isoprene, nitrile butadiene, polyamide, polyvinylchloride, styrenebutadiene, polysulfide, polyolefins, polyphenylsulfides and polysulfones (e.g. Astrel® a trademark of 3M, polyether sulfone of ICI and Udel®, a trademark of Union Carbide). Most preferably, a polyamide is employed, and even more preferably, a nylon such as nylon 66 which is a condensation product of adipic acid and hexamethylenediamine, nylon 6 which is a polymer of caprolactam, nylon 4 which is a polymer of butyrolactam (2-pyrrolidone), nylon 2 made from butadiene, and the like. The most preferred nylon is the nylon 12 available under the trademark of L25 FVS 40 from EMS of Switzerland.

Other suitable materials include cross-linked polymers, such as cross-linkable polyolefins which extrude like thermoplastics and then cure upon exposure to heat, moisture, radiation, or some other external influence. One such material is a cross-linked polyethylene which moisture cures through a condensation reaction, forming siloxane cross-links. These materials can withstand higher temperatures and have better burst properties than regular polyethylene.

One preferred material is available from AT Plastics of Canada under the trademark Aqualink® or Flexet. Another is available from Geon of Ohio under the trademark Syncure®. Both are silane-functionalized copolymers of ethylene and ethylene vinyl silane.

In the melt extruding process for the formation of fluoropolymer layers, the extrusion temperature that is utilized ranges from about 500 to about 800° F., preferably about 550–700° F., with the screw revolutions per minute (RPM) ranging from about 1 to about 100 RPM, preferably 5–50 RPM.

Cross-linking and/or adhesion of the layers can occur through a number of techniques. One method utilizes an autoclave amine cure system with temperature and pressure at 320° F. and 80 PSI, respectively. Another method utilizes a continuous autoclave and salt bath with temperature and pressure at 400–500° F. and 1 atm, respectively. Another method utilizes an oven with temperatures exceeding 40–60 degrees C. Still other methods can also be used.

Figure 2:
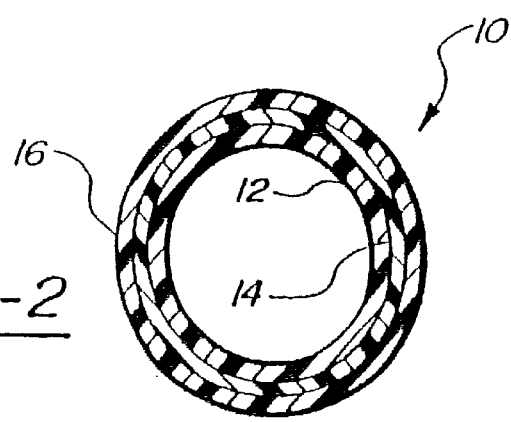
FIG. 2 is a cross-sectional view of FIG. 1 along lines 2—2.

The end product that is produced is the multi-layered fluoropolymer having a different polymer material 16 chemically bonded on top 10 as shown in FIGS. 1 and 2. The conductive layer 12 is co-extruded with the non-conductive layer 14. The conductive particles (not shown) are present in the layer 12.

When conductivity in the fluoropolymer layer is not desired, then the same non-conductive fluoropolymer is co-extruded to form the multiple layers. Obviously, one may desire only one fluoropolymer layer, in which case, a single extrusion die could be used. Thereafter, the additional processing steps are followed.

Additionally, a braided reinforcing material can be placed between the layers to provide added strength to the tube. This reinforcing material may be layered in between the fluoropolymer layer and the different polymer layer, or in a preferred embodiment, may be layered on top of the composite tube, with an added layer of the different polymer on top.

Prior to the extruding of the top polymer layer 10, the fluoropolymer should be electronically activated. In other words, the outer portion of layer 14 which is to come into contact with the layer 10 should have its surface treated in such a way so as to electronically activate the fluoropolymer surface. Electronic activation, as used herein, refers to a process which creates activated electronic states at the surface of the fluoropolymer. These states may comprise broken, bent, strained or dangling bonds between the atoms comprising the fluoropolymer surface. Likewise, electronically activated states may comprise free radicals, or chemical bonds which, while not broken, are in a high energy state. It will be appreciated that the electronically activated surface of the fluoropolymer facilitates the formation of chemical bonds between the fluoropolymer and subsequently applied bodies of material. Within the context of this disclosure Achemical bonds are defined to include covalent and ionic bonds as well as those other bonds created by electronic or electrostatic attraction such as by Van der Waal's forces. Such other bonds may include pi bonds, hydrogen bonds, electrostatic bonds or the like. By the creation of electronically activated surface states on the body of the fluoropolymer, a subsequent layer of polymer may be bonded thereto without the need for adhesives or mechanical treatment of the surface.

It is generally desirable to eliminate processing steps requiring mechanical abrasion or like treatments of the substrate, since such treatments can damage or weaken the fluoropolymer, leading to early failure of fuel lines made therefrom. Also mechanical treatments generally require the use, and associated maintenance of fairly precise equipment. Likewise, it is generally desirable to avoid the costs and equipment associated with adhesive based processes.

In one embodiment, the fluoropolymer layer 14 is subjected to a charged gaseous atmosphere that is formed by electrically ionizing a gas which contacts the substrate 14. It is most preferred that the plasma impinge upon 360° of the fluoropolymer tube. In other words, there is a first stage mixed gas plasma electrode discharge where approximately 270° of the tube is subjected to the mixed gas plasma discharge. The tube is anywhere from about 0.05 to 3 inches, preferably 0.1 to 0.5 inches from the electrode as the tube passes through the mixed gas plasma electrode discharge. Thereafter, within approximately 3 inches to 3 feet, preferably 6 inches to 18 inches from the first mixed gas plasma discharge device, the tube comes in contact with a second stage mixed gas plasma discharge placed on the opposite side from the first side, where again the tube is subjected to approximately a 270° contact around the tube with the mixed gas plasma discharge. In this fashion, the entire circumference of 360° of the tube is subjected to activation by mixed gas plasma discharge.

Any conventional mixed gas plasma discharge equipment can be used. One such device is available from Enercon Dyne-A-Mite, Model B12, which uses an air blown electrical arc to form the mixed gas treatment plasma. In other words, there are four separate mixed gas plasma discharge heads making up four separate stages which are in th e open air, at ambient temperature and pressure. Each mixed gas plasma discharge head of the Enercon device, each trapezoidal in shape, has a pair of wire electrodes (0.065 inches diameter) in the same horizontal plane separated by a gap of 0.35 inches with an overall length from the end of one wire electrode to the end of the second wire electrode of 1.9 inches.

It is to be appreciated that the open air and open atmosphere is the most preferred economical approach for mixed gas plasma discharge . It is to be appreciated further that depending upon the amount of activation that is required and the particular materials th at a re to be applied to the fluoropolymer, closed chamber electrode discharge device s could be utilized. In a closed chamber environment, a pair of oppositely charged (positive and negative electrodes) may be utilized by passing a current therebetween, thereby ionizing a gas. The substrate can pass through the electric field which has ionized the gas. This gas may be altered by supplying additional gases to the chamber such as oxygen, nitrogen or other reactive gases such as carbon monoxide, fluorinated gases, carbon dioxide, hydrogen fluoride, carbon tetrafluoride, ammonia, and the like. The chamber may be operated at vacuum pressure such as from 0.01 to 100 torr (1 atmosphere equals 760 torr).

Alternatively, silane or non-silane coupling agents could be included in the gas stream in order to come in contact with the fluoropolymer surface. Since silanes are typically liquids at room temperature, a silane coupling agent could be fed into the gas stream through which the fluoropolymer moves. Alternatively, the coupling agent could be applied to the fluoropolymer in a step separate from the activation step, through conventional methods such as vapor deposition, spray, wipe, bath, and the like.

A coextrusion die is used for high production rates. Therefore, the extruded tube as it passes through the mixed gas plasma discharge stage moves at a high constant rate.

Preferably, the rate is from 1 to 150 linear feet per minute (FPM), preferably 15 to 60 FPM. The Enercon device has a treatment area for the mixed gas plasma discharge with a size of about 22 inches by 2 inches per head.

When the Enercon Dyne-A-Mite mixed gas plasma discharge device is utilized, the activated tube is not significantly hot to the touch, but is perhaps 10 or 20° F. over ambient temperature. This increases the safety in manufacturing the fuel tube or pipe. The Enercon device is preferably operated at an output of 15,000 volts with 30 milliamps plasma per electrode with 2 electrode stages being employed. The wattage that is applied to the electrodes in order to ionize the gas can vary substantially. For example, the wattage may vary from 250 joules/sec to 600 joules/sec when the tube being treated is moving about 25 sq. inches/min. (assuming 1 inch outer diameter tube, 12 inches long), i.e. about 10 to 24 joules per linear foot of tube.

In an alternate embodiment, the fluoropolymer surface can be exposed to a flame prior to activation by treatment with a mixed gas plasma. Flame exposure prior to activation can serve to increase the bond strength between the fluoropolymer and different polymer layers. In one embodiment, the fluoropolymer surface is exposed to a propane torch flame just prior to mixed gas plasma treatment.

Other means of electronic activation, in addition to the mixed gas plasma process, can also be utilized to create surface states on the fluoropolymer. For example, in an alternate embodiment, the fluoropolymer substrate can be immersed in a chemical bath. For example, the polymer may be immersed in a sodium naphthalate bath. The sodium naphthalate may be complexed or uncomplexed. Thereafter, the fluoropolymer is immersed in a washing bath, preferably an alcohol-water wash bath. Such chemical treatment will create an electronically activated surface. In yet another alternate embodiment, the fluoropolymer surface is electronically activated by being exposed to a high-energy, UV laser, such as an excimer laser. In other instances, activation of surface electronic states may be accomplished by bombarding the surface with x-rays or gamma rays, or with an electron beam. Still other means of activating the surface of the fluoropolymer substrate can be utilized, such as any method which has the affect of altering the molecular states of the fluoropolymer surface, without mechanically altering the surface, such as by pitting or grooving the fluoropolymer substrate. Flame treatment of the fluoropolymer surface prior to the activation step, as has been previously described, can also be used in conjunction with these other means of electronic activation. Likewise, silane and non-silane coupling agents may also be combined with the activation step in order to increase adhesion between the layers. Preferably, the coupling agent is selected to be compatible with the different, outer polymer layer of choice. For example, silane is a preferred coupling agent for cross-linked polyethylene; acid or or amines are the preferred coupling agents for nylon. Other combinations are known in the art.

Figure 3:
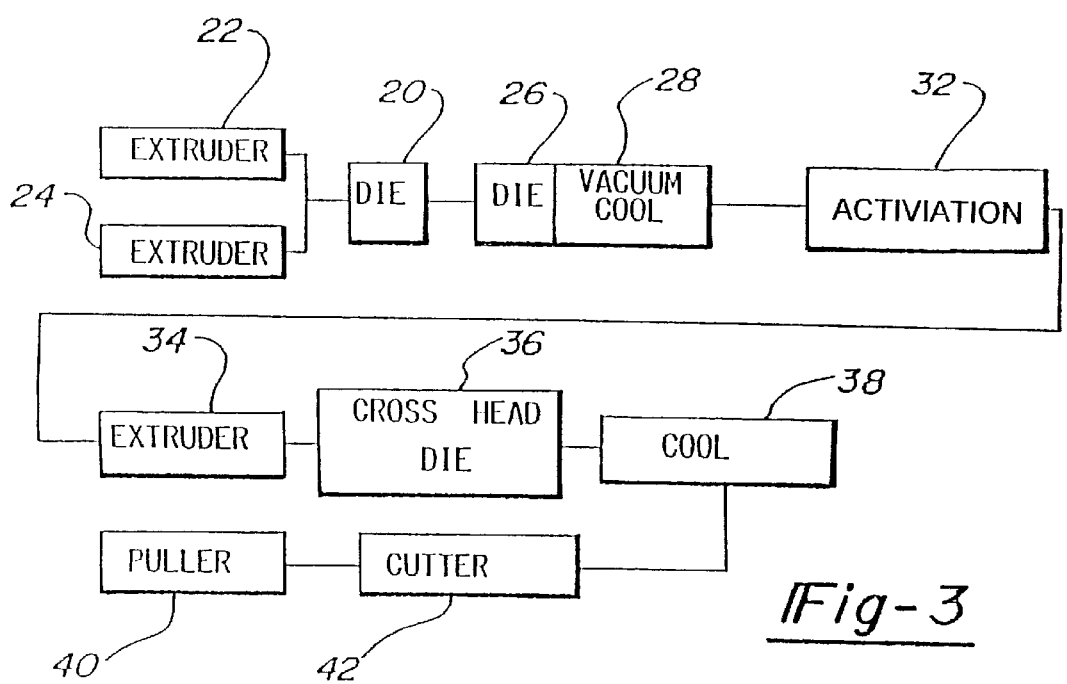
FIG. 3 is a schematic diagram of the process for the method of preparing the fuel pipe of the present invention.

After the activation of the surface of the fluoropolymer, the other different polymer is extruded through the cross-head die as shown schematically in FIG. 3. If the different polymer material does not already contain a curing or coupling agent, then a one may be added prior to layering on top of the fluoropolymer. Just as with the flame exposure step, the addition of the curing or coupling agent serves to increase the strength of the chemical bonds between the layers. Silanes are preferred coupling agents, though others may be used.

The cross-head die is at an extrusion temperature sufficient to soften the different polymer material. Generally, the temperature is significantly less than the extrusion temperature of the fluoropolymer. The operative temperature for the cross-head die would range from about 100 to about 500° F., preferably 120 to about 200° F., with screw rotations per minute (RPM) of 10 to 100 RPM, preferably 20 to 60 RPM, with a line speed of approximately 5 to 100 feet per minute, preferably 15 to 70 feet per minute.

By electronically activating the surface of the fluoropolymer substrates by methods such as exposure to a charged gaseous atmosphere, sodium naphthalate bath, coupling agents, or a high-energy source, various functional groups such as carbonyl, carboxyl, hydroxyl groups and others may readily bond to the molecular structure of the fluoropolymer substrate surface. These groups can provide sites for potential chemical bonding with other materials by way of secondary interactions such as hydrogen bonding, van der Waal's interactions, and others. These interactions may occur between the activated states on the surface of the substrate and groups present in the molecular make-up of the applied polymer layer, or between the activated states and additives contained within the applied polymer layer (such as curing or coupling agents). These interactions achieve a chemical bond between the substrate and second layer. Polymers such as nylons and urethanes already have functional groups present in their molecular structure such that additional curing agents are unnecessary in order to achieve this chemical bonding with the activated fluoropolymer surface.

There may also exist the possibility to form covalent chemical bonds to the activated fluoropolymer substrate surface. For example, curing agents such as amines react with carboxyl curing sites of a neat polymer matrix to form amide crosslinks. Similarly, curing agents or functional groups present at the interface may react with chemical groups in the substrate surface forming covalent bonds to the substrate. These linkages may further react to the applied different polymer layer. For example, many thermosetting materials such as ethylene-acrylic elastomer (VAMAC®) may utilize amine curing agents such as triethylene tetramine, which, along with ethylene-acrylic elastomer (VAMAC®) are capable of forming chemical bonds with the activated fluoropolymer substrate surface. In another example, the cross-linked polyethylene forms chemical bonds with the activated fluoropolymer. This chemical bond can be strengthened by using a silane coupling agent which reacts with both the cross-linked polyethylene and the activated fluoropolymer.

The fuel line or pipe of the present invention is designed to carry hydrocarbon fuels that are generally used in vehicles such as automobiles, trucks, airplanes, locomotives, and the like. The fuel is generally heavy in hydrocarbon materials such as propane, butane and aromatics, such as benzene, toluene and other combustible organic materials. The combined laminate or composite therefore prevents the escape of fuel vapors from the fuel line. Other fuels such as alcohol-based fuels may also be carried in the fuel pipe of the present invention. Further, other hydrocarbon-based fluids such as hydraulic fluids may likewise be utilized in conjunction with the pipe of the present invention. Finally, the properties of the pipe of this invention make it an excellent choice for general chemical handling.

It is to be appreciated that by using the multiple extrusion stages at different positions in the manufacturing process, one can efficiently combine a fluoropolymer that has a high melt extrusion temperature with a different polymer material which typically has substantially lower extrusion temperatures. By melt extruding the fluoropolymer layer(s) first and then cooling down the formed pipe by running the formed tube through room temperature water, one can thereafter use a separate and distinctly different polymer to extrude onto the pipe and avoid thermal degradation.

EXAMPLE 1

The surface energy of various treated fluoropolymers was tested. When a dyne solution is placed on a material surface and wets out, that indicates that the material has a higher surface energy than the dyne solution. If the drop "beads up," the material has a lower surface energy than the dyne solution. The use of the dyne solutions is a technique for determining the surface energy of materials. Various samples were prepared of fluoropolymer substrates. Each of the substrates were subjected to a dyne solution identified as ethyl Cello-Solve-Formamide (Trademark of Corotec of Connecticut, U.S.A.). The sample plaques were wiped clean with a dry cloth to remove surface contamination. Solvent was not used to avoid any surface effects from the residue. The dyne solution was applied in a single side-stroke of the brush to leave a 1 inch by 1 inch patch of solution. Measurements were taken on both treated and untreated samples. The values recorded represent solution which held in a continuous film for greater than 2 seconds. Treated samples were prepared by sweeping the discharge head of the Enercon-Dyne-A-Mite device. Treated samples were prepared by sweeping the discharge head across the plaque at a rate of 3 inch to 2 inch away from the sample surface. Two passes were made to ensure complete coverage. Listed below are the test results for the samples tested.

| Sample | Initial ($E_s$ - Surf. Energy) | After Treatment ($E_s$ - Surf. Energy) |
|---|---|---|
| KYNAR 740[1] | 42, 41, 42 | 44, 45, 44 |
| HYLAR 460[2] | 45, 46, 45 | 64, 58, 60 |
| HALAR 500[3] | 34, 35, 34 | 40, 37, 39 |
| TEFZEL 200[4] | L30, L30, L30 | 34, 34, 33 |

[1]KYNAR 740 is a trademark of Atochem of North America for PVDF.
[2]HYLAR 460 is a trademark of Ausimont of Morristown, New Jersey for PVDF.
[3]HALAR 500 is a trademark of Ausimont of Morristown, New Jersey for ECTFE.
[4]TEFZEL 200 is a trademark of DuPont of Wilmington, Delaware for ETFE.

The results indicate that there is a change in surface energy which indicates that the Enercon mixed gas plasma discharge device activates the fluorinated samples, and that they may be satisfactory substrates for extrusion of a different polymer through the formation of chemical bonds between the layers.

EXAMPLE 2

Two 4"×4"×0.010" sheets of extruded ETFE (DuPont Tefzel7 200) were labeled as sample A and sample B. A slab of uncured ethylene/acrylic elastomer (DuPont VAMAC®) was placed over sample A and the two materials were clamped together for curing. Sample B was exposed for approximately 5 seconds to a charged gaseous atmosphere as previously described and then combined with a VAMAC® layer and clamped as with sample A. Both samples were placed in a circulating air oven at 180° C. for 30 minutes to cure the thermosetting layer. Samples were then removed and allowed to cool at room temperature for 30 minutes. Samples were removed from clamps and cut into strips using an ASTM χ"×6" die and Arbor press. Six strips from each sample were tested for lap shear strength by separating the layers at the ends of the strip, leaving a 3 0 mm section of joined material at the center. Each layer of the strip was attached to an opposing tensile machine fixture and the sample was pulled apart at a rate of 50.8 mm/min. Maximum load obtained during the test was recorded. As can be seen from the results, a greater than 500% increase in bond strength over the unexposed samples was achieved by exposure of the substrate to the charged gaseous atmosphere. Actual bond strength of exposed samples is assumed to be greater than reported as all 6 strips failed by tensile failure of the ETFE layer, rather than by separation at the interface.

| Sample | Average Maximum Load (Newtons) | Standard Deviation |
|---|---|---|
| Sample A No exposure | 4.5 N | 0.8 |
| Sample B Exposed to charged gaseous atmosphere | 28.5 N | 5 |

EXAMPLE 3

Two 1" diameter tubes of extruded ETFE were labeled sample A and sample B. Two propane torches were adjusted to produce a 6" flame, and held by hand so that only the tip of the flame contacted the ETFE surface of sample B. The torches were positioned on opposite sides of sample B approximately 1.5' prior to sample B entering the mixed gas plasma chamber. Sample A entered the chamber without prior flame exposure. Subsequent to activation, a layer of nylon was extruded around the fluoropolymer tube. The samples were then tested for bond strength by separating the ETFE and Nylon layers and then pulling these layers apart on a tensile machine while recording force required to separate. These tests showed a 235% increase in maximum load (highest reading of force obtained during test), and a 387% increase in average load with the addition of the flame-treatment. Values obtained for Work (load×length pulled) could not be compared directly as the bond strength of the flame-treated sample was such that the ETFE inner layer failed after a 45 mm of pull as opposed to the standard test pull of 500 mm.

| Sample | Maximum Load (N) | Mean Load (N) |
|---|---|---|
| A No flame treatment | 34.37 | 16.85 |
| B With flame treatment | 115.2 | 82.32 |

While the activation of surface states of the fluoropolymer in the foregoing examples was by mixed gas plasma, activation may be similarly accomplished by other techniques of the present invention, with equal advantage. For example, exposure of the polymer to high intensity U.V. radiation from a Kr/F excimer laser also raises the surface energy of the fluoropolymer, as does bombardment with an electron beam. Chemical treatment, as by the aforementioned sodium naphthalate bath also increases surface energy in a similar manner.

EXAMPLE 4

Three ¼ inch internal diameter tubes of extruded ETFE were labeled samples A, B, and C. A layer of cross-linked polyethylene was extruded on top of sample A. The sample was then placed in an oven for one hour at approximately 120 degrees C. No adhesion was observed. Sample B was activated by exposure to mixed gas plasma discharge. Thereafter, a layer of cross-linked polyethylene was extruded on top. The sample was then placed in an oven for one hour at approximately 120 degrees C. Excellent adhesion was observed, but was diminished upon immersion in a hot water bath. Sample C was activated by exposure to mixed gas plasma discharge. Thereafter, the surface of the sample was wiped with a dilute solution of 3-aminopropyltrimethoxysilane. Thereafter, a layer of cross-linked polyethylene was extruded on top. The sample was then placed in an oven for one hour at approximately 120 degrees C. Excellent adhesion was observed, even after immersion in a hot water bath.

While the forms of the invention herein described constitute presently preferred embodiments, many other are possible. It is not intended herein to mention all the possible equivalent forms or ramifications of the invention. It is understood that the terms used herein are merely descriptive rather than limiting and that various changes may be made without departing from the spirit or scope of the invention.

What is claimed is:

1. A method of preparing a layered product comprising the steps of:

forming a fluoropolymer substrate having at least one surface;

electronically activating said surface of said fluoropolymer substrate in a mixed gas plasma containing a coupling agent so as to create electronically activated surface states thereupon without mechanically altering said surface; and applying to said electronically activated surface a polymer selected from the group consisting of thermoplastic polymers and thermoset polymers, so as to form chemical bonds between said surface and said polymer.

2. The method of claim 1, wherein said step of forming comprises extruding said fluoropolymer substrate.

3. The method of claim 1, wherein said mixed gas plasma has air as a majority constituent.

4. The method of claim 1, wherein said coupling agent comprises a silane.

5. The method of claim 1, wherein said step of applying comprises extruding said polymer onto said first surface of said fluoropolymer.

* * * * *